United States Patent [19]

Habermeier et al.

[11] 3,915,987

[45] Oct. 28, 1975

[54] N-HALOGENOMETHYL DERIVATIVES OF BIS-HYDANTOINS

[75] Inventors: Jürgen Habermeier, Pfeffingen; Daniel Porret, Fresens, Ne, both of Switzerland

[73] Assignee: Ciba-Geigy Corporation, Ardsley, N.Y.

[22] Filed: Feb. 7, 1975

[21] Appl. No.: 548,049

Related U.S. Application Data

[63] Continuation-in-part of Ser. No. 341,640, March 15, 1973, abandoned.

[30] Foreign Application Priority Data

Apr. 4, 1972   Switzerland.......................... 4892/72

[52] U.S. Cl..... 260/309.5; 260/30.6 R; 260/45.7 P; 260/45.8 N
[51] Int. Cl.$^2$.......................................... C07F 9/65
[58] Field of Search................................ 260/309.5

[56] References Cited
OTHER PUBLICATIONS

Behrend et al., Liebigs Annal. Chemie, Vol. 365, pp. 38–49 + drawing (1909).

Long et al., J. Amer. Chem. Soc. Vol. 70, pp. 900–903, (1948).

Schlogl et al., J. Med. Chem. Vol. 4, pp. 231 & 256 relied on (1961).

*Primary Examiner*—Natalie Trousof
*Attorney, Agent, or Firm*—Luther A. R. Hall

[57] ABSTRACT

N-Halogenomethyl derivatives of bis-hydantoins, which are reactive partners for condensation reactions, in particular with alkyl esters of phosphorous acid to the dialkoxyphosphonomethyl derivatives. These latter compounds can be used as additives in plastics to confer non-inflammability. The preparation and use of the N-halogenomethyl derivatives are described.

6 Claims, No Drawings

N-HALOGENOMETHYL DERIVATIVES OF BIS-HYDANTOINS

The invention relates to chloromethylhydantoins and bromomethylhydantoins as well as chloromethyldihydrouracils and bromomethyldihydrouracils and processes for the manufacture of these compounds.

The chloromethylhydantoins and bromomethylhydantoins are crystalline, very hygroscopic substances which are hydrolysed even by atmospheric humidity. They are very reactive partners for condensation reactions.

Whilst German Offenlegungsschrift No. 2,064,474 has disclosed 3-halogenomethyldantoins substituted in the 1-position, these compounds suffer from the disadvantage that they only possess a single reactive group.

The compounds according to the invention have the following formula I or I':

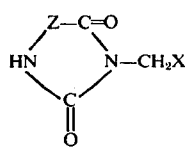 (I)

or

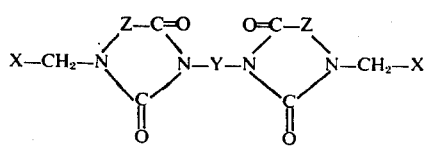 (I')

wherein Z denotes a nitrogen-free divalent radical which is required to complete a five-membered or six-membered heterocyclic ring, Y denotes a divalent aliphatic, cycloaliphatic or araliphatic radical and X denotes chlorine or bromine.

Z preferably represents a methylene group which can be substituted by alkyl groups with one to six carbon atoms or by a cycloalkylidene group. Z can be especially the iso-propylidene group, also the n- or iso-propylmethylene group, the cyclohexylidene group or the cyclopentylidene group. Furthermore, Z can also denote an ethylene group optionally substituted by alkyl groups with one to four carbon atoms, such as the ethylene group, the 1,2-dimethyl-ethylene group, the 2,2-dimethyl-ethylene group or the 1-methyl 2-isopropyl-ethylene group.

Y in the formula I' preferably denotes an alkylene group, such as the methylene, ethylene, butylene, hexylene or dodecylene group, or an alkylene group interrupted by oxygen atoms, such as 3-oxapentamethylene.

The new compounds are valuable partners for condensation reactions, since they possess two reactive groups one halogenomethyl group and one reactive hydrogen, or two halogenomethyl groups. They can condense with alcohols, phenols and the like, and in particular also with alkyl esters of phosphorous acid to give dialkoxyphosphonomethylhydantoins or dialkoxyphosphonomethyldihydrouracils. These compounds can be used, for example, as additives in plastics, to confer non-inflammability.

The bis-hydantoin derivatives of this invention possessing two chloromethyl groups can react with bis-phenols to prepare high molecular weight aromatic polyethers having useful high temperature properties. W. R. Sorenson and T. W. Campbell, "Preparative Methods of Polymer Chemistry," 2nd Edition, Interscience Publishers, New York, 1968, pp. 180–182 relate the preparation of aromatic polyethers derived from bis-phenol A.

A prime objective of this invention relates to the preparation of N-halogenomethyl derivatives of hydantoin as intermediates in the preparation of the corresponding N-dialkoxyphosphonomethyl derivatives of hydantoin which in turn are useful flame retardants for a variety of polymeric systems. The N-halogenomethyl derivatives are directly converted to the corresponding phosphonate esters using phosphite esters, such as triethyl phosphite, in the well-known Arbuzov reaction.

The phosphonate esters attached to hydantoin moieties are particularly useful as flame retardants possessing as they do both nitrogen and phosphorus. The particularly efficacious activity as flame retardants of certain molecules containing both nitrogen and phosphorus is well-known as described by J. W. Lyons, "The Chemistry and Uses of Fire Retardants," Willey-Interscience, New York, 1970, pp. 20–21, 189,354–357. Phosphonates are widely useful as flame retardants in many polymeric systems including cellulosics ibid, pp. 184–189, polyurethanes, pp. 354–357, and polyesters, pp. 373–374, 398–401. In the latter case the phosphonates are often incorporated into polyester melts where they self-polymerize and transesterify with the polyester involved. The phosphonate esters made from the N-halogenomethyl derivatives of bis-hydantoins of this invention are useful as flame retardants in a variety of polymeric systems.

The N-halogenomethyl derivatives of this invention are manufactured according to methods which are in themselves known by reacting the corresponding, in part known, N-hydroxymethylhydantoins or N-hydroxymethyldihydrouracils of the formula II or II'.

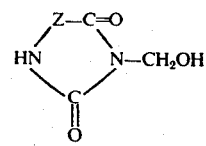 (II)

or

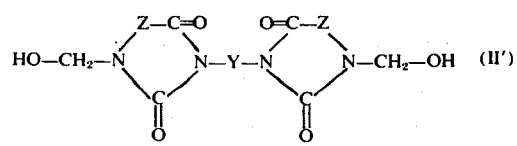 (II')

with compounds which introduce chlorine or bromine, especially with acid halides, preferably inorganic acid halides such as $SOCl_2$ or $SOBr_2$. $PCl_3$, $PCl_5$, $PBr_3$, $POCl_3$ and the like, as well as organic acid chlorides such as oxalyl chloride, are also suitable for this purpose. A further possibility is the action of hydrogen chloride or hydrogen bromide on the N-hydroxymethyl compounds. The latter are obtained by addition of formaldehyde to the corresponding cyclic ureides.

EXAMPLE 1

3-Chloromethyl-5,5-dimethylhydantoin

A mixture of 474 g of technical 3-hydroxymethyl-5,5-dimethylhydantoin (3 mols), 500 ml of chloroform and 0.8 ml of pyridine is stirred at 50°C in a dry glass apparatus equipped with a stirrer, thermometer, dropping funnel and reflux condenser with gas outlet. A solution of 428.4 g of thionyl chloride (3.6 mols) in 500 ml of chloroform is added dropwise to the colourless suspension over the course of 1.5 hours at 50°–55°C reaction temperature. A clear solution is thereby produced. After the dropwise addition, the mixture is stirred for a further 10 hours at 65°C to complete the reaction. The solution is cooled and concentrated to dryness at 10 mm Hg/80°C. The resulting colourless crystals mass is subsequently dried to constant weight at 80°C under 20 mm Hg.

514 g of crude 3-chloromethyl-5,5-dimethylhydantoin (97% of theory) are obtained in the form of colourless crystals. This crude product melts at 120°–128°C. The potentiometric titration shows a content of 5.31 equivalents of $N_1$–H groups/kg (93.7% of theory) and 4.62 equivalents of chlorine/kg (81.6% of theory).

EXAMPLE 2

3-Chloromethyl-5,5-pentamethylenehydantoin

A mixture of 238 g of 3-hydroxymethyl-5,5-pentamethylenehydantoin (1.2 mols), 300 ml of dioxane and 0.6 ml of pyridine is stirred at 62°C in accordance with Example 1. Under these conditions, the bulk of the hydantoin derivative dissolves. A solution of 164.2 g of thionyl chloride (1.38 mols) in 180 ml of dioxane is added dropwise over the course of 1.75 hours, whilst stirring. Thereafter the mixture is stirred for a further 6 hours at 65°C; towards the end of this time, $SO_2$ and HCl are expelled by blowing in nitrogen.

Working up takes place according to Example 1 and 254.2 g (97.7% of theory) of a light ochre-coloured crystal powder melting at 166°–170°C are obtained. The product can be purified by recrystallisation, for example from anhydrous acetone. It then melts at 174°–176°C. The chlorine content is then 14.8% (corresponding to 90.5% of theory). The proton-magnetic resonance spectrum (100 Mc-H-NMR, recorded in deuterochloroform ($DCl_3$) against tetramethylsilane (TMS) shows, through the following signals, that 3-chloromethyl-1,3-diazaspiro-(4.5)-decane-2,4-dione of the structure shown below has been produced.

Multiplet at $\delta = 1.35$-$2.2$ = methylene protons of the six-membered ring
Singlet at $\delta = 5.25 = N_3$—$CH_2$—Cl
Singlet at $\delta = 7.75 = N_1$ —H

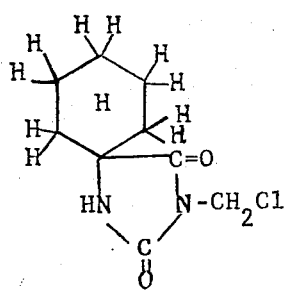

EXAMPLE 3

3-Chloromethyl-5,5-dimethylhydantoin

A solution of 1,186 g of industrially produced 3-hydroxymethyl-5,5-dimethylhydantoin (7.5 mols) in 1,500 ml of dioxane is stirred at 60°C in an apparatus according to Example 1. 3.75 ml of pyridine are added to the clear solution and then a solution of 1,026 g of thionyl chloride (8.62 mols) in 1,125 ml of dioxane is added dropwise over the course of 50 minutes at 60°C, whilst stirring. The reaction is slightly exothermic so that the heating bath is removed periodically. After the dropwise addition, the mixture is stirred for a further 5 hours at 60°C. Thereafter it is concentrated to constant weight at 60°C/15 mm Hg and a dark yellow crystal mass is obtained in quantitative yield. The resulting crude product is purified by crystallising it from a mixture of 350 ml of dioxane and 2,500 ml of petroleum ether. After drying, 1,034 g (78% of theory) of colourless, needle-shaped crystals melting at 132.4° C are obtained (Mettler Fp 51; 0.1°C/Minute).

The elementary analysis gives the following values:

| found: | calculated: |
|---|---|
| 40.89% C | 40.81% C |
| 5.25% H | 5.14% H |
| 15.97% N | 15.86% N |
| 19.98% Cl | 20.07% Cl |

The proton-magnetic resonance spectrum (60 Mc—H—NMR in $CDCl_3$, against TMS) shows, through the following signals, that the structure given below is correct.

| 6 protons: | $\delta =$ | 1.50 (singlet) |
| 2 protons: | $\delta =$ | 5.30 (singlet) |
| 1 proton: | $\delta =$ | 6.8—7.2 (multiplet) |

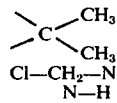

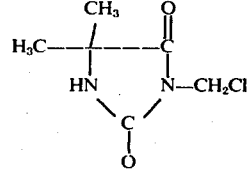

EXAMPLE 4

3-Bromomethyl-5,5-dimethylhydantoin

Analogously to Example 3, a mixture of 173.9 g of technical 3-hydroxymethyl-5,5-dimethylhydantoin (1.1 mols) and 400 ml of dioxane is reacted, after the addition of 2 ml of pyridine, over the course of 70 minutes with a solution of 250 g of thionyl bromide (1.203 mols) in 300 ml of dioxane at 50°C, whilst stirring. Thereafter, the mixture is stirred for a further 4 hours at 90°C. It is then concentrated to dryness at 70°C/20 mm Hg and dried to constant weight at 0.3 mm Hg/70°C. A yellowish crystal paste is obtained in quantitative yield.

This paste is treated with a mixture of 400 ml of diethyl ether and 100 ml of hexane and the mixture is filtered after 30 minutes. The product is dried at 20°C over $P_2O_5$, under 12 mm Hg. 126 g (without working up the mother liquor) of a light ochre coloured crystalline product are obtained, which according to bromine analysis is 87% pure.

Fo analysis, a sample is recrystallised from cyclohexane/methylene chloride (2:1) and subsequently from dioxane/benzene (1:1). A colourless crystal powder is obtained, which melts at 115°–116.5°C and proves to be extremely hygroscopic and easily hydrolysable.

The elementary analysis shows:

| found: | calculated: |
|---|---|
| 32.7% C | 32.6% C |
| 4.1% H | 4.1% H |
| 12.4% N | 12.6% N |
| 33.0% Br | 36.15% Br |

The purity, with respect to bromine content, is 91.3% of theory.

The proton-magnetic resonance spectrum (100 Mc—H—NMR in $CDCl_3$ against TMS) shows the following signals:

$\delta = 1.42$ (singlet)

$\delta = 5.20$ (singlet)

$\delta = 6.71$ (singlet)

This proves that 3-bromomethyl-5,5-dimethylhydantoin of the following structure has been produced:

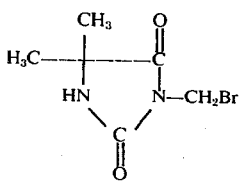

EXAMPLE 5

3,3'-Methylene bis(1-chloromethyl-5,5-dimethyldantoin)

A solution of 27.3 of thionyl chloride (0.23) and 30 ml of dioxane is added dropwise, over the course of 70 minutes, to a mixture of 37.8 g of 3,3'-methylene bis-(1-hydroxymethyl-5,5-dimethylhydantoin) (0.115 mol), 40 ml of dioxane and 0.1 ml pyridine, analogously to Example 1. Thereafter the mixture is stirred for a further 9 hours at 60°C. The solution is then concentrated at 100°C/20 mm Hg and dried to constant weight at 130°C/0.3 mm Hg. 41.3 g of a brownish, crystalline product (98.4% of theory) having a chlorine content of 18.3% of chlorine and a melting point of 187°C–193°C are obtained.

A crude product distilled in a bulb tube at 180°C/0.2 mm Hg yields a colourless, crystalline distillate which after solidification shows a melting point of 191°–195°C.

Elementary analysis:

| found: | calculated |
|---|---|
| 42.76% C | 42.75% C |
| 4.93% H | 4.97% H |
| 15.28% N | 15.34% N |
| 19.07% Cl | 19.41% Cl |

The product has the following structure:

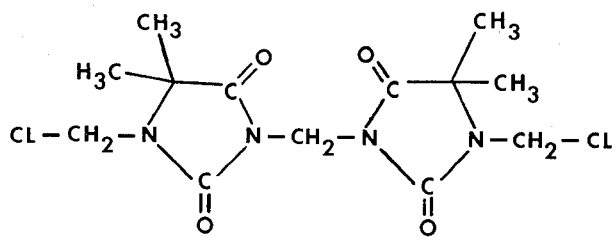

EXAMPLE 6

3.3'-Hexamethylene bis (1-chloromethyl-5,5-dimethyldantoin

A solution of 25.0 g of thionyl chloride (0.21 mol) and 30 ml of dioxane is added dropwise over the course of 55 minutes, at 60°C, to a mixture of 39.8 g of 3,3'-hexamethylene bis-(1-hydroxymethyl-5,5-dimethylhydantoin) (0.10 mol), 40 ml of dioxane and 0.1 ml of pyridine, analogously to Example 1. After 9 hours at 60°C, the reaction is complete and working up takes place according to Example 1. The product is dried at 120°C/0.2 mm Hg. 42.8 g of a yellow clear, highly viscous product having a chlorine content of 14.81% of chlorine (91.1% of theory) are obtained.

A crude product distilled in a bulb tube at 185°C/0.14 mm Hg gives a pale yellowish, highly viscous distillate showing the following analytical data:

| found: | calculated: |
|---|---|
| 49.93% C | 49.66% C |
| 6.62% h | 6.48% H |
| 12.7% N | 12.87% N |
| 15.80% Cl | 16.29% Cl |

The product has the following structure:

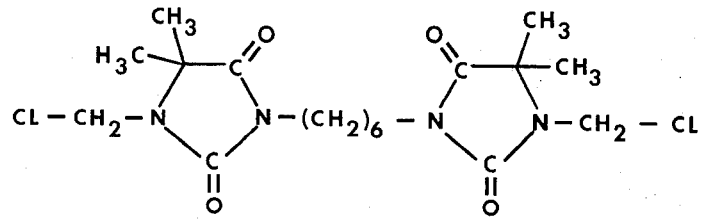

APPLICATION EXAMPLES

EXAMPLE I

Condensation of 3-chloromethyl-5,5-dimethylhydantoin with bisphenol A

A solution of 228.3 g of bisphenol A (1.0 mol) in 1,500 ml of dioxane is stirred at 25°C and 46 g of sodium metal (2.0 mols) are added in pieces. The sodium dissolves, with evolution of hydrogen. To complete the reaction, the mixture is stirred at 100°C reaction temperature until all the sodium has dissolved. A very thick paste is thereby produced. Thereafter a solution of 371 g of the 3-chloromethylhydantoin (2.1 mols) manufactured according to Example 3 in 1.500 ml of dioxane is added dropwise over the course of 45 minutes at 98°–100°C whilst stirring. The paste is thereby converted into a thin, yellow suspension. After the dropwise addition, the suspension is stirred for a further 15 hours at 100°C. It is then cooled to 60°C and the sodium chloride produced is filtered off. The mixture is then concentrated to dryness at 50°C/15 mm Hg and is dried to constant weight at 50°C/0.15 mm Hg.

509 g of a light ochre-coloured crystalline body (100% of theory) melting at 56°C (Mettler FP51 at 1°/minute) are thus obtained.

The proton-magnetic resonance spectrum (60 Mc-H-NMR in CDCl$_3$ against TMS) shows, through the presence of the signals for

($\delta = 1.40$);

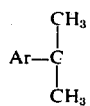

($\delta = 1.65$), N—CH$_2$—O ($\delta = 3.75$); N—H ($\delta = 6.4$) and aromatic 3 – H ($\delta = 6.8 - 7.5$), that the crude product having the structure shown below is about 90% pure.

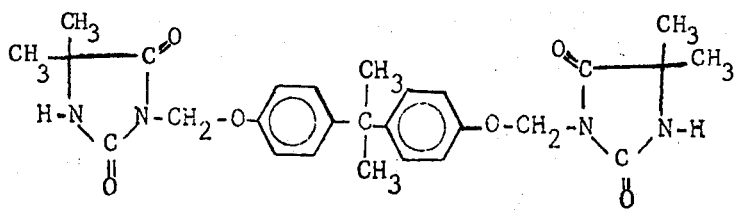

Glycidylation 124 g of the bis-hydantoin (0.244 mol) are stirred with 452 g of epichlorohydrin (4.88 mols) and 1.6 g of 50% strength aqueous tetramethylammonium chloride solution for 0.75 hour at 90°C and are thereafter subjected to an azeotropic circulatory distillation at 60°C which is adjusted so that at 140°C bath temperature an internal temperature of 60°C results (vacuum 50–85 mm Hg) and that rapid distillation occurs. 44.9 g of 50% aqueous sodium hydroxide solution are then added dropwise over the course of 2 hours whilst the water present in the reaction mixture is continuously removed azeotropically and separated off. Distillation is continued for about a further 45 minutes and the mixture is then cooled to 40°C. The sodium chloride produced in the reaction is removed by suction filtration and the organic phase is washed with 80 ml of water. The organic phase is then concentrated completely (60°C/20 mm Hg), 50 ml of water are added and all the volatile constituents are again distilled off, under the conditions mentioned; the same is subsequently repeated with 50 ml of toluene. Finally, the material is dried to constant weight at 60°C.

140 g (92.4%) of a crude diglycidyl compound which is highly viscous and clear but of a light brown colour are obtained. The epoxide content is 3.7 equivalent/kg Curing 63.2 parts of the resin obtained are mixed with 36.8 parts of hexahydrophthalic anhydride and 0.5 part of benzyldimethylaniline at 80°C and the mixture is cured in aluminium moulds of 4 mm wall thickness for 1 hour at 80°C, then for 2 hours at 120°C and subsequently for 12 hours at 150°C. Clear, transparent slabs having the following mechanical properties are obtained.

| | |
|---|---|
| Flexural strength (VSM 77,103) | : 15–17 kg/mm$^2$ |
| Deflection (VSM 77,103) | : 5–8.6 mm |
| Impact strength (VSM 77,105) | : 10–16,5 cm. kg/cm |
| Heat distortion (DIN 53,461) | : 120–121°C |
| Water absorption (4 days/20°C) | : 0.34% |

EXAMPLE II 192.5 g of a suspension of sodium-cyclopentadiene in toluene, of about 22.9% (0.5 mol) strength, is treated dropwise at 60°C, whilst stirring, with a solution of 88.3 g of the 3-chloromethyl-5,5-dimethylhydantoin manufactured according to Example 3 (0.5 mol) in 350 ml of dioxane. After the dropwise addition, the mixture is stirred for a further 15 hours at 90°.

Thereafter, the sodium chloride produced is filtered off hot and the solution is concentrated to dryness at 60°C/20 mm Hg. The residue is then dried to constant weight at 60°C/0.2 mm Hg.

79.0 g of a red-brown powder melting at 205.3°C Mettler FP51: 10°C/minute) are obtained.

The material is purified by recrystallisation from chloroform/hexane. A light brown product which melts at 215.3°C (Mettler FP51: 1°C/minute) is obtained.

What is claimed is:

1. A halogenomethyl bis-hydantoin of the formula

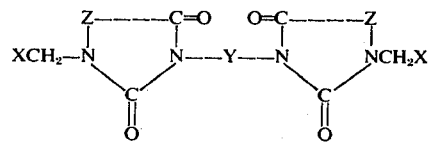

wherein

Z denotes methylene optionally substituted with alkyl of one to six carbon atoms or Z denotes cycloalkylidene of five to six carbon atoms, Y denotes alkylene of one to 12 carbon atoms 3-oxapentamethylene, and X denotes chlorine or bromine.

2. A compound according to claim 1 wherein Y denotes alkylene of one to six carbon atoms or 3-oxapentamethylene.

3. A compound according to claim 1 wherein Z denotes isopropylidene.

4. A compound according to claim 1 wherein Z denotes a cyclohexylidene group.

5. A compound according to claim 3 which is 3,3'-methylene bis(1-chloromethyl-5,5-dimethylhydantoin.

6. A compound according to claim 3 which is 3,3'-hexamethylene bis(1-chloromethyl-5,5-dimethylhydantoin.

* * * * *